April 6, 1965 V. D'ERRICO 3,176,823
TRANSFER MECHANISM FOR TUBULAR ARTICLES
Filed Oct. 24, 1962 5 Sheets-Sheet 1

Fig. 1.

INVENTOR.
VINCENT D'ERRICO
BY Leland R. McCann
George W. Reiber
ATTORNEYS

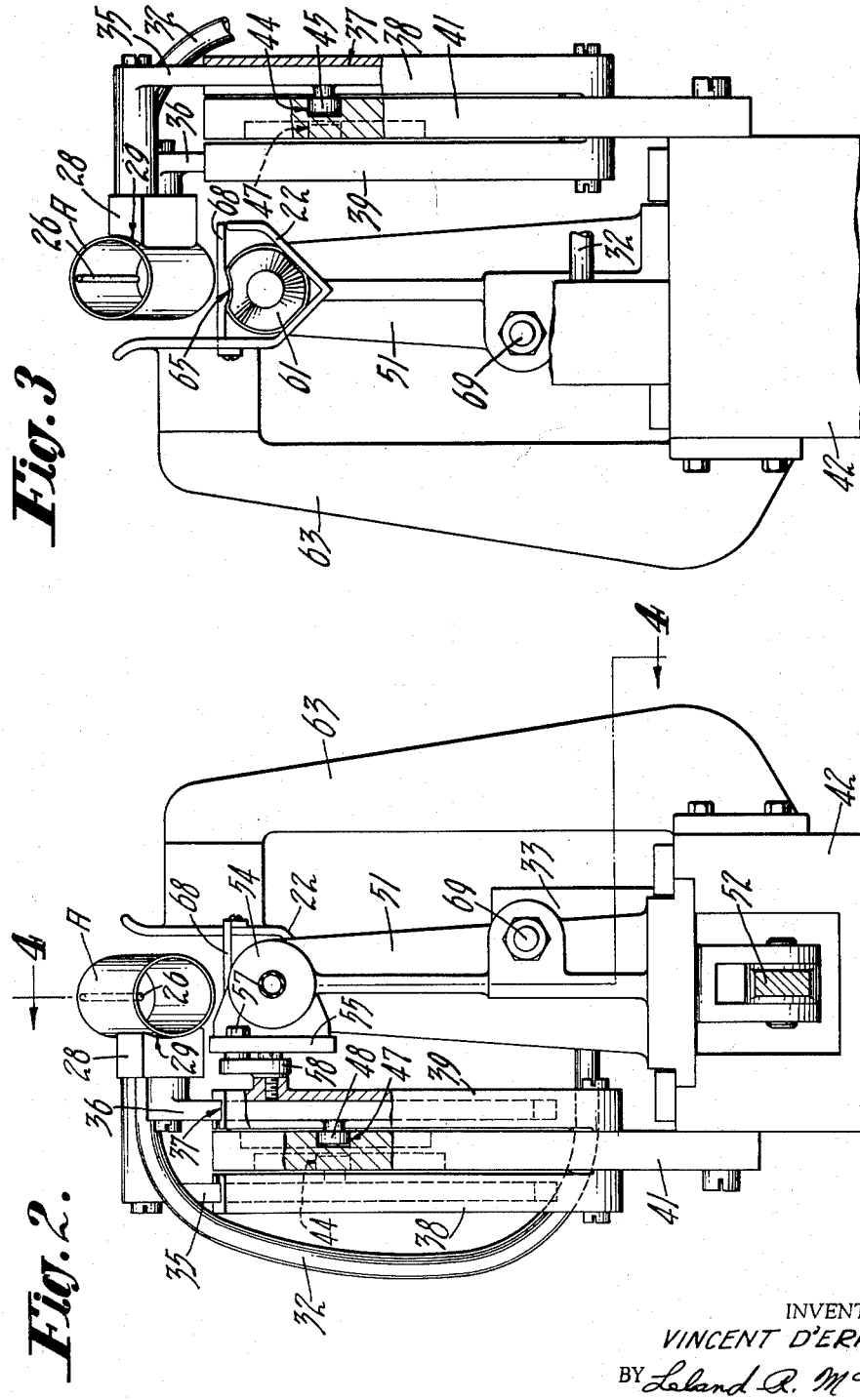

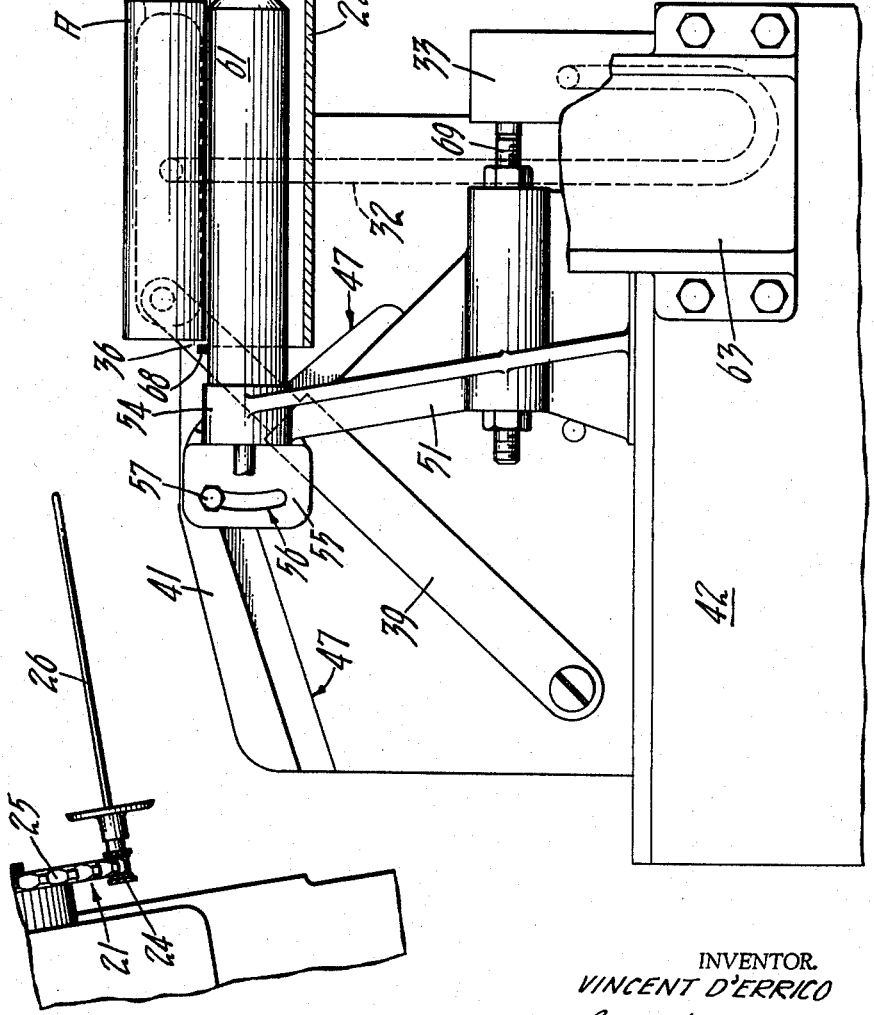

April 6, 1965  V. D'ERRICO  3,176,823
TRANSFER MECHANISM FOR TUBULAR ARTICLES
Filed Oct. 24, 1962  5 Sheets-Sheet 4
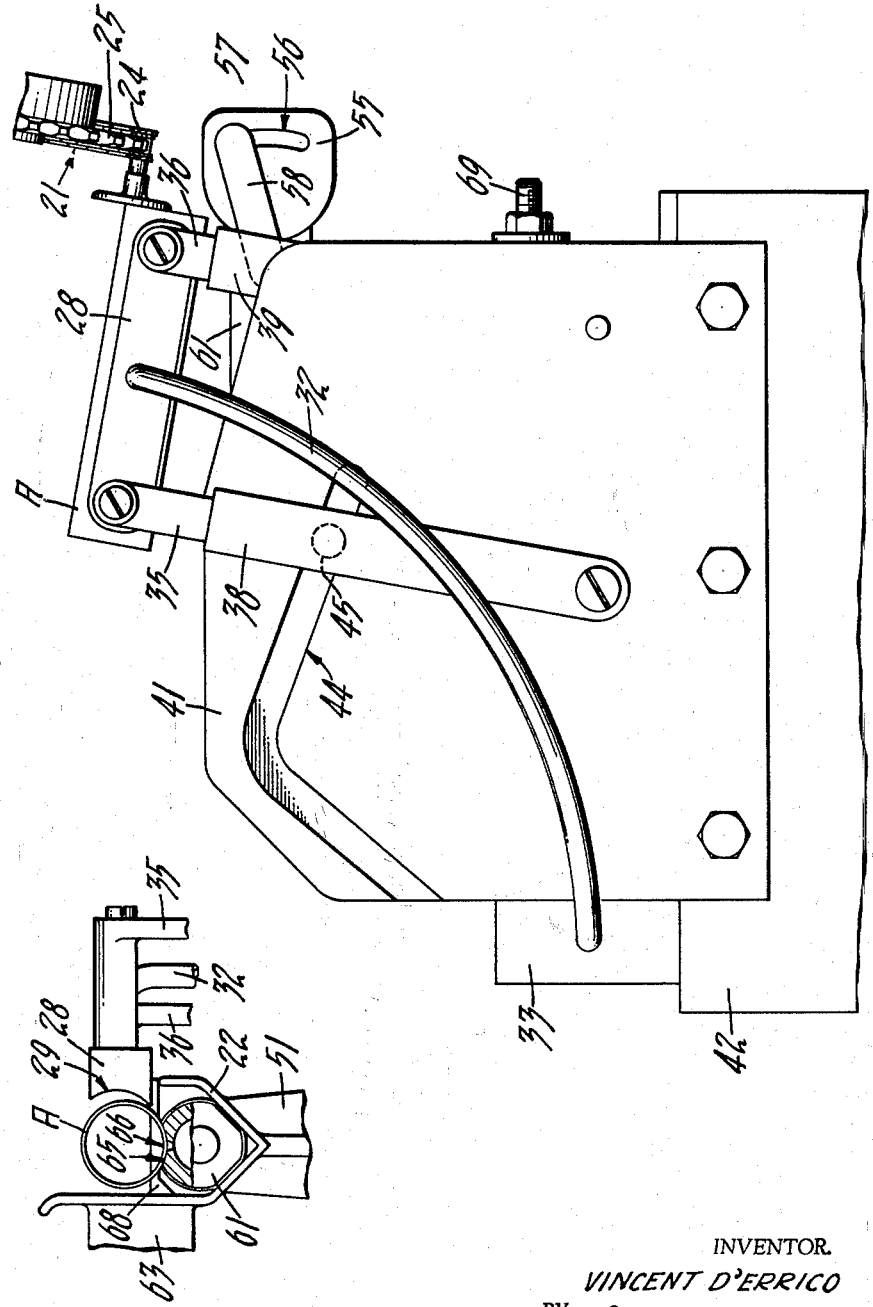
INVENTOR.
VINCENT D'ERRICO
BY Leland R. McCann
George W. Reiber
ATTORNEYS

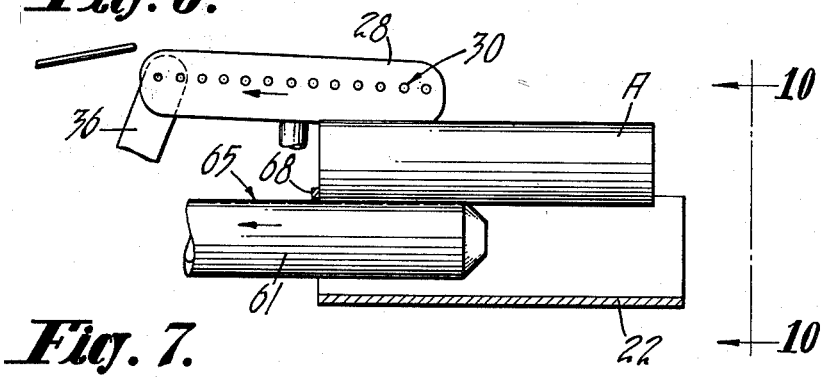
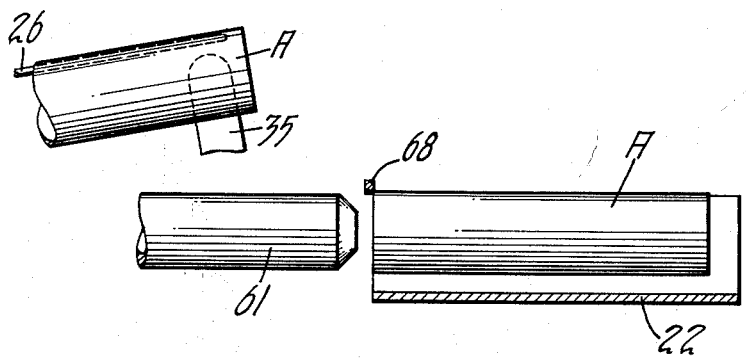
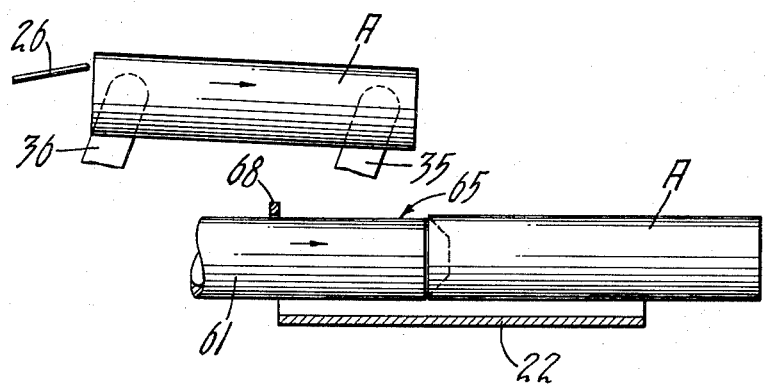

United States Patent Office 3,176,823
Patented Apr. 6, 1965

3,176,823
TRANSFER MECHANISM FOR TUBULAR ARTICLES
Vincent D'Errico, Maynard, Mass., assignor to American Can Company, New York, N.Y., a corporation of New Jersey
Filed Oct. 24, 1962, Ser. No. 232,787
7 Claims. (Cl. 198—24)

The present invention relates to a transfer mechanism for tubular articles and has particular reference to such a mechanism for use with substantially continuous operation conveyors.

In the manufacture of tubular containers such as tubes and the like made of plastic and/or thin metallic materials, the tubes or partially finished containers are advanced from one machine to another for operations such as printing, coating, etc., on moving conveyors which connect the various operation machines. The tubes being conveyed are supported on slender pins or mandrel rods which project in cantilever fashion from a conveyor chain, at spaced intervals therealong, so that the tube may be readily slid onto and off of the pins over the free ends of the pins.

In certain operations performed on the tubes, such as drying coating materials applied thereto, considerable heat, as by open flame or other heating elements, is involved. This necessitates the continuous or substantially continuous, as opposed to indexed or intermittent, operation of the conveyors independently of the operation of the work performing machines so that a stoppage of the machine does not stop the conveyors. Otherwise tubes may be stopped at the heating station and become seriously damaged.

Since the transfer mechanism essentially feeds the tubes from the conveyor to an operation machine, it must be driven so as to stop feeding when the machine stops. In the usual transfer mechanism where gripper fingers enter the path of travel of the conveyor to remove tubes therefrom, a stoppage of the transfer mechanism interferes with the substantially continuous operation of the conveyor with consequent difficulties as to operation of both devices.

It is an object of the instant invention to provide a transfer mechanism for tubular articles wherein the mechanism may be made a part of a stop-go machine performing operations on the articles and wherein the transfer elements of the mechanism are disposed permanently clear of the path of travel of a substantially continuous operation article supporting conveyor, so as to eliminate any interference between the transfer elements and the conveyor in case of stoppage of the operation machine and the transfer mechanism connected thereto.

Another object is the provision of such a transfer mechanism which is readily adapted to horizontally disposed conveyors as well as vertically disposed conveyors.

Another object is the provision of such a transfer mechanism which effects gentle transfer of the articles under precision control and without in any manner effecting distortion of the articles.

Another object is the provision of such a transfer mechanism which is adapted to transfer tubular articles of various diameters and to discharge a transferred article into a location in accordance with its diameter.

Numerous other objects and advantages of the invention will be apparent as it is better understood from the following description, which, taken in connection with the accompanying drawings, discloses a preferred embodiment thereof.

Referring to the drawings:

FIGURE 1 is a side elevational view of a transfer mechanism embodying the instant invention;

FIG. 2 is an end elevational view of the mechanism as viewed along the line 2—2 in FIG. 1, with parts shown in section;

FIG. 3 is an end elevational view as viewed along the line 3—3 in FIG. 1, with parts shown in section;

FIG. 4 is a sectional view taken substantially along the broken line 4—4 in FIG. 2;

FIG. 5 is a side elevational view showing the side opposite to that shown in FIG. 1, with parts omitted;

FIGS. 6, 7 and 8 are schematic sectional views showing different positions of certain of the elements in the mechanism during the transfer of a tubular article; and FIGS. 9 and 10 are fragmentary end elevational views of the elements shown in FIGS. 6, 7, and 8 showing different positions of the article as viewed substantially along the line 10—10 in FIG. 6.

As a preferred and exemplary embodiment of the instant invention, the drawings disclose a transfer mechanism for removing tubular container bodies A (FIGS. 1, 2 and 3), which may be made of polyethylene or the like material, from a substantially continuous operation conveyor 21 (FIG. 1) and for transferring them to a trough 22 which may be a part of a machine for receiving and performing an operation upon the bodies as an incident to converting them into finished containers.

In the manufacture of such tubular containers, the conveyor 21 preferably is disposed in an upright position at a slight angle to the vertical and comprises and endless chain 24 operating over a sprocket 25 and carrying spaced supported pins or mandrel rods 26 which project at right angles from the chain. The pins 26 are of a length slightly shorter than the container bodies A and the bodies loosely hang on the pins as the conveyor carries them along a path of travel adjacent the transfer mechanism. This conveyor preferably is operated in an intermittent manner and momentarily stops at a transfer station to permit each container body to be removed individually.

The transfer mechanism comprises a movable transfer head 28 which in its normal position at the transfer station is disposed parallel to and closely adjacent the path of travel of the container bodies A on the conveyor pins 26 but is permanently clear of the conveyor pins so that at no time during the operation of the conveyor or the transfer mechanism is the transfer head in interference with the conveyor pins.

The transfer head 28 (FIGS. 2, 3, 4, 9 and 10) preferably is maintained in a vacuumized condition and is provided with a concave shaped curved face 29 having a plurality of vacuum orifices 30 therein which permits a container body A at the transfer station to be engaged by and attracted to the transfer head for removal from the body supporting pin 26. The vacuum orifices 30 (see FIGS. 6 and 9) communicate with a vacuum tube 32 which connects with a valve 33 (FIGS. 4 and 5) (to be hereinafter explained) to cut-off the vacuum at the proper time. For the major portion of its cycle of operation the transfer head 28 is maintained under vacuum. For certain metallic container bodies this vacuum may be replaced by a magnet if desired.

The transfer head 28 is pivotally mounted so as to initially move along a line of travel parallel to the conveyor pin 26 so as to carry the attracted container body A along the pin without interference therewith until the body is completely removed from the pin and free or clear of the outer end of the pin. The head then proceeds along a downwardly curved path of travel to deposit the freed container body into the trough 22.

In order to provide for the changing path of travel of the transfer head 28, the head is pivotally mounted on the upper ends of a pair of upright slide arms 35, 36 which are disposed in vertical slideways 37 (FIGS. 2 and 3) formed in a pair of rocker arms 38, 39 (FIGS.

4 and 5) respectively to provide a parallelogram system of connections. The rocker arms 38, 39 are pivotally secured to opposite faces of a stationary vertically disposed plate cam 41 attached to the side of a frame 42 which constitutes the main frame of the transfer mechanism, but which may be a part of the frame of the body operation machine with which the transfer mechanism is associated.

One face of the plate cam 41 is formed with an inverted V-shaped cam groove 44 in which operates a cam roller 45 attached to the slide arm 35. In a similar manner the opposite face of the plate cam 41 is formed with a second identical inverted V-shaped cam groove 47 in which operates a cam roller 48 attached to the slide arm 36. Hence, when the rocker arms 38, 39 are rocked forward on their pivot points, the cam rollers 45, 47 traverse the cam grooves 44, 47 and thereby raise and lower the slide arms 35, 36 as well as carry them forward with the rocker arms to effect the desired travel of the transfer head 28 as mentioned above.

Rocking of the rocker arms 38, 39 forward through a transfer stroke and then backward through a return stroke is effected in any suitable manner in time with the intermittent operation of the conveyor 21. For this purpose, the frame 42 carries a slide bracket 51 (FIGS. 1 and 2) which is disposed in a horizontal slideway formed on top of the frame and extending parallel to the plate cam 41 attached to the side of the frame. The slide bracket 51 is reciprocated preferably by way of a link 52 pivotally attached thereto and connecting with a movable part of the body operation machine.

At its upper end the slide bracket 51 is formed with a boss 54 (FIGS. 1 and 2) from which extends a flat pad 55 having an arcuate slot 56 carrying a bolt 57 pivotally connecting a link 58 (FIGS. 2 and 5) to the rocker arm 39. Hence when the slide bracket 51 is reciprocated the link connection with the rocker arm 39 actuates the entire parallelogram system of slide arms 35, 36 and rocker arms 38, 39. The slot 56 in the pad 55 provides for desired relocation of the bolt 57 and through this relocation provides for increasing or decreasing the angular displacement of the slide arms 35, 36 only at the end of the transfer or forward stroke to compensate for the diameter of the container bodies and to place smaller diameter bodies in the trough 22 in a slightly advanced position without changing the starting or pick-up position of the bodies.

The transfer mechanism also provides for feeding or advancing into the body operation machine, the bodies which have been transferred from the conveyor 21 to the trough 22. This is brought about by a plunger 61 (FIGS. 1 and 3) which projects from the boss 54 on the slide bracket 51 and thereby moves with the bracket. This plunger extends parallel with the top of the frame 42 in a horizontal position and is axially aligned with the trough 22. The trough 22 is a V-shaped member having a length substantially equal to the length of the container bodies and is attached in a stationary position to a bracket 63 (FIGS. 1 and 2) secured to the side of the frame 42.

The plunger 61 preferably is cylindrical in shape having slightly tapered lower faces to correspond to the V-shape of the trough for sliding operation therein. Its upper or top portion preferably is formed with a concave face 65 (FIG. 10) to correspond to the curvature of tubular body A and this face is provided with a plurality of vacuum orifices 66 communicating with a suitable source of vacuum. The plunger preferably is continuously vacuumized or if desired may be connected to the valve 33 to cut off the vacuum periodically as will be explained hereinafter.

Hence the plunger 61 moves forward with the transfer head 28 and enters the trough 22 as the transfer head is lowering the tubular body A into the trough. The result of this action is that the transfer head releases the body when the body is directly over the plunger as shown in FIGS. 4 and 9. Thus when the body falls it is immediately attracted to the plunger and is held against bouncing out of the trough by the vacuum associated with the plunger as shown in FIG. 10.

Upon release of the body to the plunger in the trough, the transfer head and the plunger begin their return stroke as shown in FIG. 6, to receive and transfer the next body on the conveyor 21. During this return stroke the body A on the plunger engages against a stripper bar 68 (FIGS. 1 and 3) extending across the trough 22 just above the path of travel of the plunger and is thereby stripped off the plunger and falls to the bottom of the trough as shown in FIGS. 6 and 7. Upon the next forward or transfer stroke of the transfer head 28, the plunger 61 engages the previously transferred body now in the trough (see FIG. 8) and pushes it endwise out of the trough and into the body operation machine or other suitable place of deposit for the next operation to be performed on the body. To facilitate this feeding operation the pushing end of the plunger is conical shape to fit bodies of different diameters. This is the reason for the advanced position of small diameter bodies as mentioned heretofore.

The release of the tubular body A from the transfer head 28 to the trough 22 is effected by momentarily breaking the vacuum in the head. This is effected by actuation of the valve 33 on the frame 42. The valve is actuated at the proper time by engagement by a rod 69 (FIGS. 1 and 4) which projects from the slide bracket 51 and is disposed in axial and properly spaced relation to the valve 33.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for transferring tubular articles from a substantially continuous operation conveyor having projecting pins supporting said articles, said device comprising:
   a transfer head movable adjacent to the path of travel of said conveyor pins while simultaneously maintaining a position clear of said path for attracting and engaging said articles without interference from said pins;
   said transfer head including a concave shaped curved face conforming substantially to the contour of a tubular article body;
   vacuum means within said transfer head communicating with said curved face so that said curved face attracts and engages one of said articles along its body when said curved face is brought into close proximity with one of said article bodies;
   means for controlling the vacuum within said transfer head for attracting and releasing an article relative thereto at the proper time;
   means for moving said transfer head relative to said pins for stripping a tubular article from a said pin; and means for receiving an article from said transfer head.

2. A device of the character defined in claim 1 wherein there is provided support means for said transfer head, and means for moving said support means to move said transfer head initially along a path of travel parallel with said conveyor pins to free a said article from a said conveyor pin.

3. A device of the character defined in claim 1 wherein said transfer head is pivotally connected to a pair of slide arms and wherein there is provided cam rollers on said slide arms, stationary cam tracks for said cam rollers, a pair of pivotally mounted rocker arms supporting said pair of slide arms and forming a parallelogram connection therewith and with said transfer head to guide the travel of said transfer head, and wherein said moving means is connected to one of said rocker arms.

4. A device of the character defined in claim 1 wherein said last mentioned means is a trough disposed adjacent the path of travel of said transfer head, and wherein there is provided a plunger movable endwise into and out of said trough to feed a received article along said trough to a predetermined place of deposit.

5. A device of the character defined in claim 4 wherein there is provided means for moving said transfer head and said plunger simultaneously toward said trough for the deposit of a transferred article onto said plunger in said trough, in addition to said first transfer head moving means; means for vacuumizing a face of said plunger to retain said transferred article in a received position on said plunger; and means for stripping said retained article free of said plunger for a subsequent advancement through said trough.

6. A device of the character defined in claim 1 wherein said last mentioned means is a V-shaped trough disposed adjacent the path of travel of said transfer head, and wherein there is provided a plunger axially aligned with said trough, a slidable support for said plunger, a pivotal support for said transfer head, and means connecting said slide support with said pivotal support for actuation of said supports toward said trough in unison.

7. A device of the character defined in claim 6 wherein said connecting means is a link attached to said pivotal support and relocatably connected to said slide support to provide for increasing and decreasing the travel of said pivotal support.

References Cited by the Examiner

UNITED STATES PATENTS

| | | | |
|---|---|---|---|
| 1,839,438 | 1/32 | Prussing | 198—20 X |
| 1,910,713 | 5/33 | Prussing. | |
| 2,804,963 | 9/57 | Nowak | 198—24 X |
| 3,097,593 | 7/63 | Makowski et al. | 198—24 X |

FOREIGN PATENTS 1,179,761  12/58  France.

SAMUEL F. COLEMAN, *Acting Primary Examiner.*
WILLIAM B. LA BORDE, *Examiner.*